United States Patent [19]

Yamamoto et al.

[11] Patent Number: 4,728,390

[45] Date of Patent: Mar. 1, 1988

[54] FILMY COIL AND A MANUFACTURING METHOD FOR SUCH COIL

[75] Inventors: Kunitoshi Yamamoto, Kusatsu; Yasuji Mori, Kyoto; Torayoshi Iwata, Ootsu, all of Japan

[73] Assignee: Nissha Printing Co., Ltd., Kyoto, Japan

[21] Appl. No.: 832,719

[22] PCT Filed: Jun. 13, 1985

[86] PCT No.: PCT/JP85/00334

§ 371 Date: Feb. 13, 1986

§ 102(e) Date: Feb. 13, 1986

[87] PCT Pub. No.: WO86/00167

PCT Pub. Date: Jan. 3, 1986

[30] Foreign Application Priority Data

Jun. 15, 1984 [JP] Japan ................................ 59-124303

[51] Int. Cl.⁴ ........................... C23F 1/02; B44C 1/22; C03C 15/00; C03C 25/06

[52] U.S. Cl. ...................................... 156/630; 29/846; 156/634; 156/656; 156/661.1; 156/902; 310/208; 430/312; 430/318

[58] Field of Search ........................ 361/398; 310/208; 174/68.5; 428/209, 213; 156/629, 630, 633, 634, 640, 651, 656, 659.1, 661.1, 901, 902; 430/312, 313, 318, 323; 29/825, 829, 831, 846

[56] References Cited

U.S. PATENT DOCUMENTS 3,264,152 8/1966 Haydon .............................. 156/630

*Primary Examiner*—William A. Powell

*Attorney, Agent, or Firm*—Burns, Doane, Swecker & Mathis

[57] ABSTRACT

A filmy coil comprising a metal conductive layer of the thin-line type having a spiral pattern on one side or both sides of an optional insulating substrate film or sheet, characterized in that the interval between each adjacent metal conductive line is smaller than the thickness of the metal conductive layer, and a manufacturing method for such a filmy coil characterized in that a photoresist layer, the patterns of both sides thereof being mirror images, is made up on both sides of the metal conductive foil or sheet, then both sides of the photoresist layer are etched to the depth of 30 to 40% of the thickness of the metal conductive foil or sheet by means of chemical etching, one side of the metal conductive foil or sheet is coated by an isolated resin coat or laminated with an isolated substrate film or sheet layer, the other side of said photoresist layer is etched also by means of chemical etching until the etching grooves on both sides pass through to be connected with each other, to produce a filmy coil in the form of a metal conductive layer on a thin-line type, and if desired, two filmy coils can be attached with each other at their undersides.

6 Claims, 21 Drawing Figures

Fig. 3-a
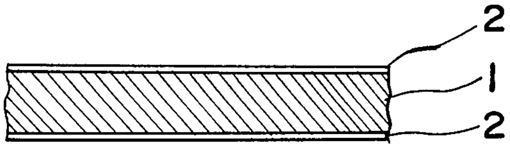
Fig. 3-b
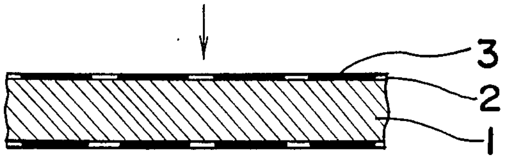
Fig. 3-c
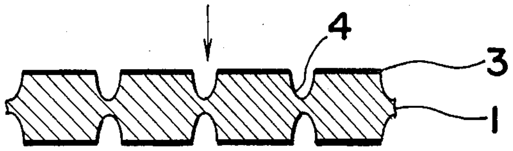
Fig. 3-d
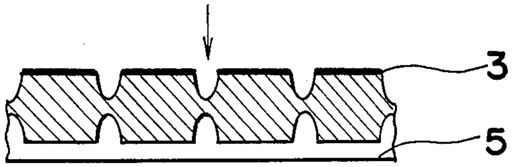
Fig. 3-e
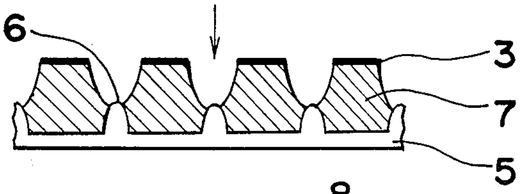
Fig. 3-f
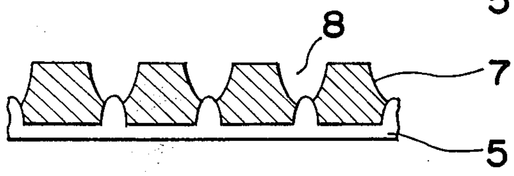

Fig. 5-a
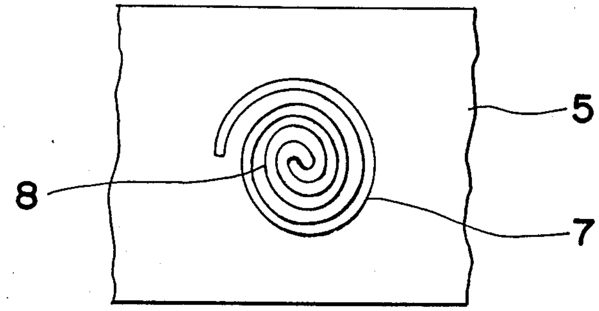
Fig. 5-b
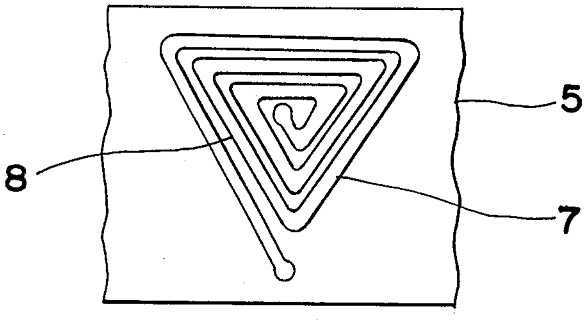
Fig. 5-c
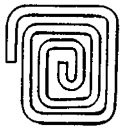
Fig. 5-e
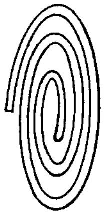
Fig. 5-d
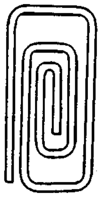
Fig. 5-f
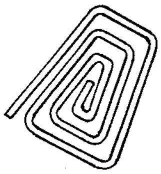

Fig. 6-a
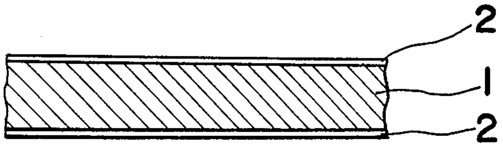
Fig. 6-b
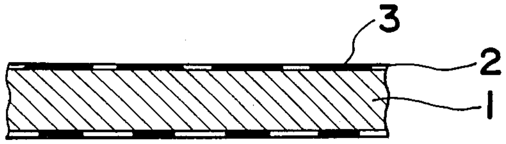
Fig. 6-c
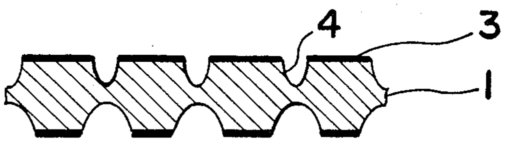
Fig. 6-d
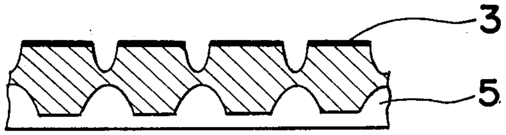
Fig. 6-e
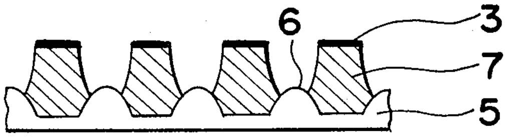
Fig. 6-f
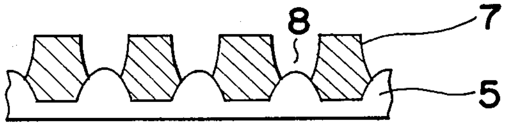

FILMY COIL AND A MANUFACTURING METHOD FOR SUCH COIL

FIELD OF THE INVENTION

The present invention relates to a filmy coil and a manufacturing method for such coil, and the object of the present invention is to provide a filmy coil of great electric characteristics having an extremely high-density pattern for use in a flat-motor and the like, and to provide a manufacturing method for such coil.

BACKGROUND OF THE INVENTION

Conventionally, this kind of filmy coil has been manufactured using a material which carries a conductive layer such as a metallic foil, a deposit, or a metallic deposit. On the surface of said conductive layer a patterned resist layer is provided, and then the surface, namely, one side of the conductive layer is etched chemically to form a linear conductive layer. With this conventional manufacturing method, however, there is the disadvantage that it takes a lot of time to etch the conductive layer from one side until it is penetrated, which raises the production cost. Moreover, particularly from a technical viewpoint, as the quantity of side etching is increased excessively and the width of a line is thinned (see FIG. 1), the interval between the lines is enlarged in order to attain a conductive layer of a proper-width-line (see FIG. 2). Therefore, another disadvantage is that a low-patterned coil is the best that can be produced.

SUMMARY OF THE INVENTION

The present inventors have found, as a result of various studies and improvements, to improve the disadvantages of the prior art as described above, that annexation of sandwich simultaneous etching and single-sided etching, both used in photoetching, eliminate the above-described disadvantages and attains the object. On the basis of this information, the present invention was completed at last.

Namely, the present invention relates to a filmy coil comprising a metal conductive layer having a thin line with a series of spiral patterns provided on one side or both sides of an optionally isolated substrate film or sheet, characterized in that the interval between each adjacent metal conductive layer is smaller than the thickness of said metal conductive layer.

Furthermore, the present invention relates to a manufacturing method for a filmy coil, characterized in that photoresist layers are formed on both sides of a metal foil or sheet, such that the sides are mirror images of each other. Both sides are etched to the degree of 30 to 40% of the thickness of the metal conductive foil or sheet by means of chemical etching. Then one side of the foil or sheet is covered with an isolated resin coat or is laminated with an isolated substrate film or sheet layer. Thereafter, the other side of said foil or sheet is etched again by chemical etching until the etching grooves on both sides of said foil or sheet have penetrated each other, and a filmy coil forming a metal conductive layer of a thin line is obtained. The rear sides of two filmy coils as above-described are laminated to each other if necessary.

DESCRIPTION OF THE EMBODIMENT

Figure 1:
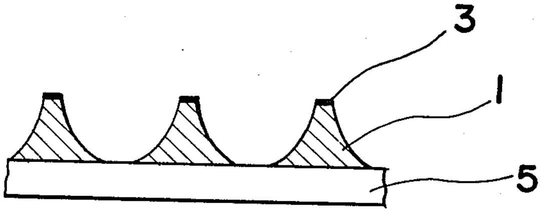
Fig. 1 PRIOR ART
Figure 2:
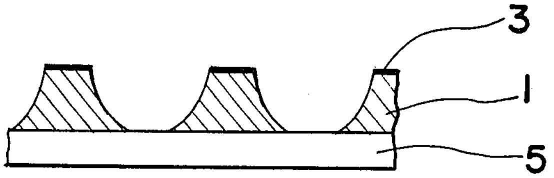
Fig. 2 PRIOR ART
Figure 4:
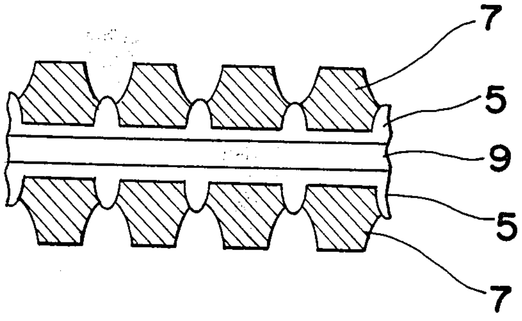

The present invention will be described in detail with respect to the drawings, in which:

FIGS. 1 and 2 are expanded cross-sectional views explaining the single-side etching used in the prior art;

FIGS. 3(*a*) to (*f*) are cross-sectional views explaining each process step of the manufacturing method according to the present invention;

FIG. 4 is a view explaining one preferred embodiment according to the present invention in which filmy coils are laminated (a cross-sectional view);

FIGS. 5(*a*) to (*f*) are views explaining preferred embodiments according to the present invention as to the configuration of the film (a plan view); and FIGS. 6(*a*) to (*f*) are views explaining the manufacturing process to use in equalizing the width of lines on both sides of a coil portion (a cross-sectional view).

First of all, the filmy coil according to the present invention will be described with reference to its manufacturing process. As shown in FIG. 3(*a*), a metal foil or sheet made of a good conductive material such as copper, silver, aluminum, nickel, gold, iron or chrome is used as a metal conductive foil or sheet 1, and a photoresist layer 2 is located on both whole sides of said metal conductive foil or sheet 1. There are various ways to form said photoresist layer 2, for instance, a water-soluble or water-insoluble photosensitive resin can be spread and dried on both sides of the metal conductive foil or sheet, or a sensitive resin film can be applied and bonded forcibly. From the technical and economical view, for the present invention, the most optimal means is that both sides of said metal conductive foil or sheet 1 are coated with a solvent-soluble photosensitive resin, which is made into the photoresist layer 2.

Then, exposure to light, printing, developing, hardening and so on are done on said photoresist layer 2 with a desirable pattern for making a hardened part 3 on said photoresist layer 2 as shown in FIG. 3(*b*). It should be noted here, with respect to the pattern of the hardened part 3, that the inside and outside patterns of the metal foil or sheet are located opposite to each other. The metal conductive foil or sheet, on the surface thereof on which the photo-resist hardened part 3 is being formed, undergoes chemical etching by a dip coating method, spray coating method and so on where a chemical corrosive liquid such as ferric chloride, ammonium persulfate, hydrochloric acid, nitric acid, sulphuric acid, caustic soda, caustic potash, and other liquids or solutions, or a mixed liquid or solution which mixes the above-mentioned various liquids or solutions. Thus, as shown in FIG. 3(*c*), both sides of the metal conductive foil or sheet 1 are etched to the degree of 30 to 40% of the thickness of the metal conductive foil or sheet 1 until etched grooves 4 are provided. The reason why the etching quantity of the etched grooves 4 is defined is to avoid bringing about the disadvantages described hereinafter:

If the depth of etching is less than 30% of the thickness of the metal conductive foil or sheet 1, the etching time during the second single-sided etching will get longer and therefore, the quantity of the side etching is increased, the line width of the conductor portion gets thinner, and the electric resistance value is increased. On the other hand, if the depth of etching is larger than 40% of the thickness of the metal conductive foil or sheet 1, the etched grooves of both sides are passed through and connected to each other, which causes a complicated treatment, non-uniform quality, and difficulty in mass-production.

After washing and drying said etched surface well enough, an isolated substrate film or sheet 5 is provided on one side of the etched surface as shown in FIG. 3(*d*). It should be noted here that said isolated substrate film or sheet 5 is coated with a resin coat layer, generally having high insulation characteristics, such as epoxy resin, phenolic resin, melamine resin, polyimide and so on, or isolated films composed of a simple substance or complex substance of polyester film, polyimide film, polypropylene film, polyethylene film, vinyl chloride film, polyvinyl chloride film and so on are laminated or bonded forcibly.

Next, as shown in FIG. 3(*e*), this film or sheet is etched again from the other side, i.e., the side where the isolated substrate film or sheet isn't provided. The metal conductive foil or sheet is etched with proper quantity until the etched grooves 4 of both sides are passed through and a bottom 6 of said isolated substrate film or sheet is revealed, thereby a coil part 7 is formed.

The photoresist hardened part, which remains on the surface of the coil part 7 provided as described above, is stripped by an adequate method, for example, by using an alkali stripping agent or a stripping agent of organic solvent and the like. Thus, the filmy coil according to the present invention is yielded as shown in FIG. 3(*f*).

In addition, as shown in FIG. 4, with respect to an alternate form of the filmy coil according to the present invention is shown in FIG. 4. A laminated-type filmy coil can be produced by bonding, through a bonding layer 9, each outside of the single-sheet filmy coils produced as described above, or a filmy coil can also be produced by connecting the coil parts 7 on both sides with each other at respective end portions so that the coil parts 7 are in a line.

There are various configurations adequate for the coil part's plan pattern, as shown in FIGS. 5(*a*) to (*f*), for example, a circular spiral configuration, a polygonal spiral configuration, a rectangular spiral configuration, an elliptical spiral configuration, and a ladder-like spiral configuration. The coil part's plan patterns are formed by single patterns of said various configurations, or arranging a plurality of said single patterns, or combining different configurations of the opposite pattern on both sides.

Furthermore, referring to the sectional configuration of the coil part 7, both sides of the coil part 7 can have the same line widths as shown in FIGS. 6(*a*) to (*f*). Such a coil part is provided without difficulty. Namely, as shown in FIG. 6(*b*), when the inside (i.e., upper side in FIG. 6(*b*) pattern of the hardened part 3 which is made on the photoresist layer 2 is a little larger than the outside (i.e., lower side of FIG. 6)) pattern, the line width of the inside pattern is decreased to be the same as the line width of the outside pattern during the second etching.

The interval 8 between coil parts 7 of filmy coils provided by the above method are usually smaller than the thickness of the metal conductive foil or sheet, particularly by the spray etching method. Generally, the interval 8 is 70 to 80% of the thickness of said metal conductive foil or sheet.

As described above, the filmy coil according to the present invention is produced by a new etching method which consists of sandwich etching and single-sided etching, instead of the known single-sided etching of a metal foil, so that the coil has a smaller line interval than the thickness of the metal foil, in other words, about a half line interval compared to the prior art. Therefore, since a very high-density coil can be provided, the coil is suitable as the coil for a flat motor and the like, and a high-density wiring film is worth using as a sheet industrially.

Hereinbelow three preferred embodiments according to the present invention will be described in detail.

EXAMPLE 1

A copper sheet of 0.1 millimeter in thickness on both sides of which a circular pattern is produced by baking after coating and drying the photoresist, is etched for three minutes from both sides by spraying ferric chloride solution of 40° C., 45Be until etching grooves having 0.03 millimeter depth are made up on both sides of the copper sheet. Then, one side of the copper sheet is coated with polyester resin and polyimide resin for providing an isolated substrate film of 0.03 millimeter in thickness. Later, the copper sheet is etched again for four minutes from the other side by spraying ferric chloride solution under the same conditions as before, and the resist layer remaining on the surface of the copper sheet is removed by being dipped in a stripping solvent of an organic solvent type. As a result, a filmy coil whose coil part has a 0.1 millimeter line width and a 0.08 millimeter interval between the lines is provided.

EXAMPLE 2

A copper sheet of 0.2 millimeter thickness, on both sides of which a triangular spiral pattern of a thin line is produced by baking after coating and drying the photoresist, is etched for about eight minutes from both sides by spraying the same etching solution as used in Example 1 until etched grooves having 0.08 millimeter in depth are produced on both sides. Then, a polyimide film of 0.05 millimeter thickness is applied on one side of the copper sheet to produce an isolated substrate film. Later, the copper sheet is etched again for four minutes from the other side by spraying the same etching solution as before, and then the resist layer remaining on the surface of the copper sheet is removed by a stripping solvent of organic solvent type. As a result, a filmy coil whose coil part has 0.2 millimeter line width and a 0.16 millimeter interval between lines is produced.

EXAMPLE 3

Two filmy coils produced as in Example 2 are laminated to each other at their isolated substrate film side, and the coil parts on the surface are connected with each other. As a result, a filmy coil having a coil on both sides is provided.

We claim:

1. A method of manufacturing a filmy coil, which comprises forming a photoresist layer of a patterned line on each side of a metal conductive foil or sheet, the line pattern of each side being the mirror image of the other and where the interval between adjacent photoresist lines is less than the metal foil thickness, etching both of said photoresist layers to a depth of 30 to 40% of the thickness of the metal conductive foil or sheet by means of chemical etching, forming an insulating substrate layer over all of one side of said photoresist layer, and etching the other side of said photoresist layer by means of chemical etching until the etching grooves on both sides pass through to connect with each other.

2. A method of manufacturing a filmy coil as claimed in claim 1, wherein the patterned photoresist layer is a spiral line pattern.

3. A method of manufacturing a filmy coil as claimed in claim 1, wherein the width of the resist layer on each side of said photoresist layer is adjusted so that the end line widths of both sides of the metal conductive layers are approximately equal.

4. A method as claimed in claim 1, wherein the insulating substrate layer is a resin coat.

5. A method as claimed in claim 1, wherein the insulating substrate layer is a laminated film or sheet layer.

6. A method as claimed in claim 1, wherein two filmy coils are attached to each other by the side of each coil having an insulating substrate layer.

* * * * *